United States Patent
Haderer

(10) Patent No.: US 12,095,398 B2
(45) Date of Patent: Sep. 17, 2024

(54) ELECTRIC DRIVE UNIT, METHOD FOR OPERATING AN ELECTRIC DRIVE UNIT AND METHOD FOR CALCULATING TEMPERATURE

(71) Applicant: Schaeffler Technologies AG & Co. KG, Herzogenaurach (DE)

(72) Inventor: Lukas Haderer, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 314 days.

(21) Appl. No.: 17/637,544

(22) PCT Filed: Aug. 5, 2020

(86) PCT No.: PCT/DE2020/100691
§ 371 (c)(1),
(2) Date: Feb. 23, 2022

(87) PCT Pub. No.: WO2021/043361
PCT Pub. Date: Mar. 11, 2021

(65) Prior Publication Data
US 2022/0286079 A1    Sep. 8, 2022

(30) Foreign Application Priority Data

Sep. 3, 2019    (DE) ............... 10 2019 123 559.6

(51) Int. Cl.
*H02P 29/68*    (2016.01)
*G01K 7/42*    (2006.01)
*H02M 1/32*    (2007.01)

(52) U.S. Cl.
CPC ............ *H02P 29/68* (2016.02); *G01K 7/42* (2013.01); *H02M 1/327* (2021.05)

(58) Field of Classification Search
CPC ................................. H02P 29/68; G01K 7/42
(Continued)

(56) References Cited

U.S. PATENT DOCUMENTS

| | | | |
|---|---|---|---|
| 11,703,051 B2* | 7/2023 | Terzo | F04C 15/0096 417/44.2 |
| 11,750,131 B2* | 9/2023 | Yokoyama | H02P 23/03 318/400.15 |
| 2011/0084637 A1 | 4/2011 | Takeuchi | |
| 2011/0084638 A1 | 4/2011 | Patel et al. | |
| 2022/0393634 A1* | 12/2022 | Tanaka | G01K 13/00 |

FOREIGN PATENT DOCUMENTS

| | | |
|---|---|---|
| DE | 19818860 A1 | 11/1999 |
| DE | 102014205121 A1 | 10/2014 |

(Continued)

*Primary Examiner* — Kawing Chan
(74) *Attorney, Agent, or Firm* — Volpe Koenig

(57) ABSTRACT

A method for calculating a temperature of an electric drive unit includes calculating a temperature model output variable (ym) using an input variable (u) and a temperature model, assigning the temperature model output variable (ym) to a system observer, and measuring an actual temperature (y) using a temperature detection element. A model state variable (xm) is regulated and outputted based on an output variable difference (Δy) between the actual temperature (y) and the output variable (ym) using the system observer. A fault mode or a normal mode of the temperature detection element is indicated using a detection state signal (s1). Depending on the signal (s1), the system observer is switched between a control mode, in which the model state variable (xm) is controlled depending on the output variable difference (Δy), and a throughput mode, in which the model state variable (xm) is calculated independently of the actual temperature (y).

9 Claims, 2 Drawing Sheets

(58) Field of Classification Search
USPC .......................................................... 318/471
See application file for complete search history.

(56) References Cited

FOREIGN PATENT DOCUMENTS

| | | |
|---|---|---|
| DE | 102015214624 A1 | 2/2017 |
| DE | 102016215590 A1 | 2/2018 |
| DE | 102018121648 A1 | 3/2020 |
| DE | 102018128647 A1 | 5/2020 |
| DE | 102019111597 A1 | 11/2020 |
| DE | 102019114235 A1 | 12/2020 |
| JP | H0654572 A | 2/1994 |
| JP | 2016082698 A | 5/2016 |
| WO | 2015101107 A1 | 7/2015 |
| WO | 2015110107 A2 | 7/2015 |

* cited by examiner

ELECTRIC DRIVE UNIT, METHOD FOR OPERATING AN ELECTRIC DRIVE UNIT AND METHOD FOR CALCULATING TEMPERATURE

CROSS-REFERENCE TO RELATED APPLICATIONS

This application is the United States National Phase of PCT Appln. No. PCT/DE2020/100691 filed Aug. 5, 2020, which claims priority to German Application No. DE102019123559.6 filed Sep. 3, 2019, the entire disclosures of which are incorporated by reference herein.

TECHNICAL FIELD

The present disclosure relates to a method for calculating temperature, an electric drive unit, and a method for operating an electric drive unit.

BACKGROUND

In a vehicle with an electric drive unit, for example with an electric motor as the traction drive, knowledge of the temperatures present in the electric motor is necessary in order to ensure the most reliable possible mode of the electric motor. By knowing the exact temperatures in the electric motor, its performance limits can be exploited in a more targeted manner. If critical temperatures are reached in the electric drive unit, permanent magnets in the electric motor can become demagnetized and insulation in the stator can melt.

The most reliable means of determining the actual temperature is to directly measure and monitor the temperature at the sensing area of interest in the electric drive unit. However, direct temperature measurement cannot always be implemented. For example, if temperature sensors for the precise measurement of the temperature cannot be attached to the intended detection area due to the space available or due to the function.

If the temperature at the selected detection area cannot be measured directly, for example if only a single temperature sensor is used, the temperature at other positions can be calculated and estimated using a temperature model. A number of different approaches for calculating temperature in an electric drive unit are known.

US 2011/0084638 A1 describes a temperature estimation module which calculates a motor temperature in an electric motor depending upon a measured oil temperature and the measured electrical current in the stator.

In JP H 0654572 A, the temperatures in the coils of the electric motor are calculated using a thermal model of the electric motor. The temperature in the coils is calculated depending upon a temperature-dependent electrical resistance of the coils, with the electrical resistance being determined by measuring the voltage and the current.

In WO 2015 101 107 A1, the temperature in an electric motor is estimated depending upon the temperature in power electronics that control the electric motor on the basis of a motor temperature model.

SUMMARY

The present disclosure provides a method to calculate a temperature on an electric drive unit in a more precise and reliable manner.

As a result of the method, the state variable can be calculated even if there is a fault in the temperature detection element, while significant heat inputs into the electric drive unit are taken into account. A complete suspension of the temperature calculation during the disruption, for example in the event of a failure, of the temperature detection element may not occur. As a result, a temperature calculation of the state variable can take place during the fault of the temperature detection element, even in spite of the missing measurement variable. The accuracy of the temperature calculation is increased.

The state space model can be a linear, time-invariant (LTI) model between the input variable and the output variable. The LTI model can be described with the following two equations.

$$\dot{x} = A \cdot x + B \cdot u$$

$$y = C \cdot x \qquad \text{ZEqn4(1)}$$

where x is the state variable, u is the input variable, y is the output variable, A is a system matrix, B is an input matrix, and C is an output matrix.

The state variable may be a non-measurable value, for example a temperature at an inaccessible position and/or a heat flow.

The system observer can be a Luenberger observer and can be described using the following two equations.

$$\dot{x}_m = (A - L \cdot C) x_m + B \cdot u + L \cdot y$$

$$y_m = C \cdot x_m \qquad \text{ZEqn3(2)}$$

where xm is the model state variable, u is the input variable, y is a measurement variable corresponding to the output variable, ym is the model output variable, A is the system matrix, B is the input matrix, C is the output matrix, and L is a feedback matrix.

In an example embodiment, when there is a detection state signal corresponding to a fault in the temperature detection element, the throughput mode is switched on.

In an example embodiment, when there is a detection state signal corresponding to a normal mode of the temperature detection element, the control mode is switched on.

In a further embodiment, the input variable is indicative of a heat input into the electric drive unit. The model state variable can be a temperature that differs from the model output variable, and the model output variable can be a temperature that represents the measurement variable. The input variable can be electrical power, electrical voltage and/or heat flow.

In an example embodiment, the throughput mode corresponds to the control mode, except for the difference that the model output variable is set as the measurement variable and thus the output variable difference is set to zero.

In an example embodiment, an error signal is output depending on a calculation state value, which is dependent on the detection state signal. If the calculation state value corresponds to a value indicative of a fault, the error signal can be output.

In a further embodiment, the calculation state value assumes a value which is indicative of a fault as soon as there is a detection state signal corresponding to a fault in the temperature detection element for a first time period which is longer than a first specified time period.

In an example embodiment, a state of the temperature model can be described via a model state signal, which indicates an accuracy of the temperature model depending on the output variable difference. The calculated state value may assume a value which is indicative of a fault as soon as there is a model state signal corresponding to a fault of the temperature model for a second time period which is longer than a second specified time period.

The calculation state value may be dependent on the first time period, the first specified time period, the second time period and the second specified time period. The electric drive unit can be put into an emergency mode depending on the calculation state value.

At least one of the objects specified above is also achieved by an electric drive unit for a vehicle, having an electric motor with a stator and a rotor, wherein at least one model state variable of the electric drive unit is calculated using a method having at least one of the features specified above.

The present disclosure also provides a method for operating such an electric drive unit, wherein the electrical energy introduced into the electric drive unit is adjusted depending on the model state variable.

BRIEF DESCRIPTION OF THE DRAWINGS

The present disclosure is described in detail below with reference to the drawings. Specifically.

DETAILED DESCRIPTION

Figure 1:
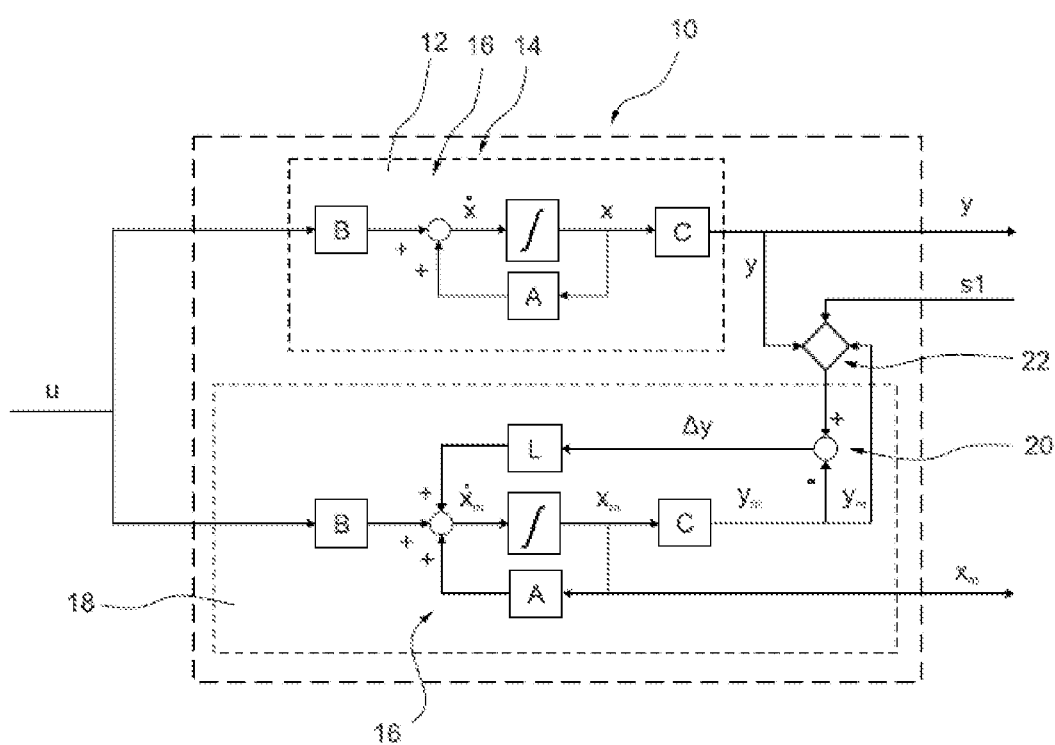
FIG. 1 shows a block circuit diagram of a method for temperature calculation in an example embodiment of the present disclosure.

FIG. 1 shows a block circuit diagram of a method 10 for temperature calculation in an example embodiment. The method 10 for temperature calculation is carried out, for example, on an electric drive unit 12 fed by electric energy. The electric drive unit 12 can be arranged in a vehicle and can have an electric motor with a stator and a rotatable rotor.

A temperature of the electric drive unit 12 as an output variable depends on an input variable u via a system context 14 of the electric drive unit 12. The system context 14 can be described by a temperature model 16 via a state space model, via which a relationship between the input variable u and the output variable can be specified. The input variable u is indicative of a heat input into the electric drive unit 12. For example, the input variable u can be an electrical power, an electrical voltage and/or a heat flow.

An actual temperature at at least one position of the electric drive unit 12 is measured as a measurement variable y via a temperature detection element. The temperature detection element is a temperature sensor, for example, which is arranged at a predetermined position of the electric drive unit 12.

The temperature model 16 can also be used to calculate state variables x of the electric drive unit 12 that cannot be directly measured. The state variable x is, for example, a non-measurable temperature at an inaccessible position and/or a heat flow.

The temperature model 16 built on a state space model is assigned to a system observer 18, which uses the temperature model 16 to calculate a state variable xm representing the actual state variable x and a model output variable ym representing the measured variable y depending on the input variable u. The state space model is may be a linear, time-invariant (LTI) model between the input variable u and the measurement variable y. The LTI model can be described with the following two equations.

$$\dot{x} = A \cdot x + B \cdot u$$

$$y = C \cdot x \quad \text{ZEqn1(3)}$$

where A is a system matrix, B is an input matrix, and C is an output matrix.

The system observer 18 regulates the state variable xm depending on an output variable difference Δy between the measurement variable y and the model output variable ym and causes the state variable xm to be output. The system observer 18 can be a Luenberger observer and can be described using the following two equations.

$$\dot{x}_m = (A - L \cdot C) x_m + B \cdot u + L \cdot y$$

$$y_m = C \cdot x_m \quad \text{ZEqn2(4)}$$

where A is the system matrix, B is the input matrix, C is the output matrix, and L is the feedback matrix.

The system observer 18 provides a self-regulating adjustment of the state variable xm depending on the output variable difference Δy. As a result, the temperature model 16 is supported by the measurement variable y and a deviation between the calculated state variable xm and the actual state variable x is reduced.

If, on the other hand, the measurement variable y is not available in the event of a fault in the temperature detection element, then the system observer 18 lacks the measurement variable y as an input value. As a possible consequence, the failure of the temperature sensing element could be indicated and the temperature calculation stopped. However, the electric drive unit 12 operated. When there is no temperature calculation still experiences heat inputs that are no longer taken into account in the suspended temperature model 16. If the temperature calculation is started again after the fault in the temperature detection element has been eliminated, there may be a large discrepancy between the calculated state variable xm and the actual state variable x due to the information not taken into account during the fault.

Figure 2:
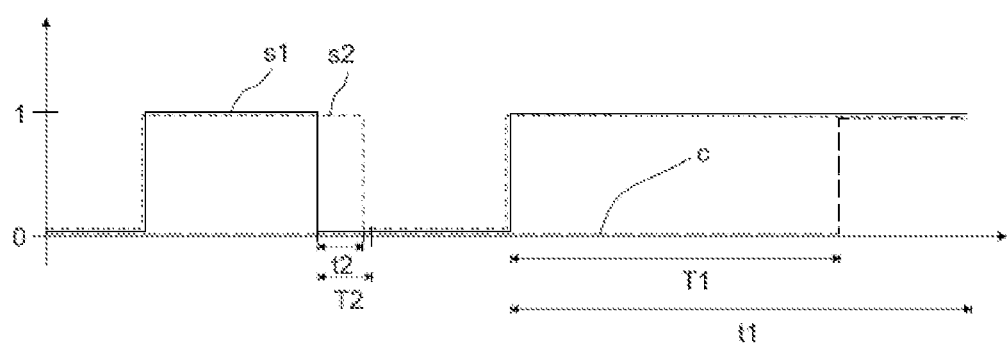
FIG. 2 shows a time course of a detection state signal and a model state signal in a method for temperature calculation in a further example embodiment of the present disclosure.

Therefore, in the method 10 for temperature calculation, a fault and a normal mode of the temperature detection element are made recognizable via a detection state signal c (ref. FIG. 2). Depending on the detection state signal c, the system observer 18 is switchable between a control mode, in which the state variable xm is controlled depending on the output variable difference Δy and a throughput mode, in which the state variable xm is calculated independently of the measurement variable y. When there is a detection state signal corresponding to a fault of the temperature detection element, the throughput mode is switched on, and when there is a detection state signal corresponding to a normal mode of the temperature detection element, the control mode is switched on.

As a result, the state variable xm can be calculated even if the temperature detection element fails. Meanwhile, significant energy inputs into the electric drive unit 12 are taken into account. A complete suspension of the temperature calculation during the failure of the temperature sensing element cannot occur. As a result, a temperature calculation of the state variable xm can take place during the fault of the temperature detection element even in spite of the missing measurement variable y.

The calculation 20 of the output variable difference Δy is preceded by a case selection 22 which, depending on a detection state signal s1, forwards either the measurement variable y or the model output variable ym to the calculation 20 of the output variable difference Δy. If the throughput mode is switched on depending on the detection state signal s1, for example, in the case of a detection state signal s1 which is indicative of a fault in the temperature detection element, then the case selection 22 outputs the model output variable ym to the calculation 20 of the output variable difference Δy. Since this calculation 20 assumes the model output variable ym as the second difference element, the output variable difference Δy is zero in continuous mode and thus corresponds to an open-loop mode of the temperature calculation. This means that the temperature can be calculated via the throughput mode in spite of the presence of a fault in the temperature detection element and the absence of a measurement variable y as a support point for the temperature calculation.

If the normal mode is switched on depending on the detection condition signal s1, for example, in the case of a detection condition signal s1 which is indicative of a control mode of the temperature detection element, then the case selection 22 outputs the measurement variable y to the calculation of the output variable difference Δy. This means that the measurement variable y can be used as a reference point for the temperature calculation and the temperature calculation can be carried out more precisely.

FIG. 2 shows a time course of a detection state signal s1 and a model state signal s2 in a method for temperature calculation in a further example embodiment. The detection state signal s1 is 1 in the event of a fault in the temperature detection element and 0 in the case of a normal mode of the temperature detection element.

The model state signal s2 indicates an accuracy state of the temperature model and is dependent on the output variable difference and a predetermined maximum output variable difference. The model state signal s2 has a value of 1 when a predetermined maximum output variable difference is exceeded and otherwise a value of zero.

The calculation state value c is 0 when both the detection state signal s1 and the model state signal s2 are 0. However, if one of the two signals is 1, the calculation state value c does not immediately assume the value 1. Only when the detection state signal s1 has a value of 1 over a first time period t1, which is longer than a first specified time period T1, is the calculation state value c set to the value 1. Also, the calculation state value c is changed to the value 1 when the model state signal s2 assumes a value of 1 for a second time period t2 that is longer than a second specified time period T2.

A calculation state value c of 1 indicates a fault and thereby triggers an error signal to be output. If the calculation state value c has a value of 1, i.e., the error signal is output, then the electric drive unit can be put into emergency mode, for example.

REFERENCE NUMERALS

10 Method
12 Electric drive unit
14 System context
16 Temperature model
18 System observer
20 Calculation
22 Case selection
A System matrix
S Input matrix
C Output matrix
c Calculation state value
s1 Detection state signal
s2 Model state signal
T1 First specified time period
t1 First time period
T2 Second specified time period
t2 Second time period
u Input variable
x State variable
xm Model state variable
Δy Output variable difference
y Measurement variable
ym Model output variable

The invention claimed is:

1. A method for calculating a temperature of an electric drive unit having an electric motor comprising: a stator; and a rotor, wherein a model state variable (xm) is calculated by the method comprising:
providing: a temperature model describing a system context of the electric drive unit via a state space model;
a system observer; and
a temperature detection element; calculating a temperature model output variable (ym) using an input variable (u) and the temperature model;
assigning the temperature model output variable (ym) to the system observer;
measuring an actual temperature (y) corresponding to the input variable (u) at a measuring position of the electric drive unit using the temperature detection element;
regulating and outputting the model state variable (xm) of the system context based on an output variable difference (Δy) between the actual temperature (y) and the temperature model output variable (ym) using the system observer; indicating a fault mode or a normal mode of the temperature detection element using a detection state signal (s1); and depending on the detection state signal (s1), switching the system observer between: a control mode, in which the model state variable (xm) is controlled depending on the output variable difference (Δy); and a throughput mode, in which the model state variable (xm) is calculated independently of the actual temperature (y); and
wherein an electrical energy introduced into the electric drive unit is adjusted depending on the model state variable (xm).

2. The method of claim 1 further comprising switching the system observer to the throughput mode when the detection state signal (s1) indicates the fault mode.

3. The method of claim 1 further comprising switching the system observer to the control mode when the detection state signal (s1) indicates the normal mode.

4. The method of claim 1, wherein: the input variable (u) is indicative of a heat input into the electric drive unit; the model state variable (xm) is a temperature different from the temperature model output variable (ym); and the temperature model output variable (ym) represents the actual temperature (y).

5. The method of claim 1, wherein the throughput mode corresponds to the control mode, except that the temperature model output variable (ym) is set as the actual temperature (y) so that the output variable difference (Δy) is zero.

6. The method of claim 1 further comprising outputting an error signal depending on a calculation state value (c) which is dependent on the detection state signal (s1).

7. The method of claim 6, wherein the calculation state value (c) assumes a value which is indicative of a fault after the detection state signal (s1) indicates the fault mode for a first time period (t1) longer than a first specified time period (T1).

8. The method of claim 6 further comprising: determining an accuracy of the temperature model depending on the output variable difference (Δy); and indicating the accuracy of the temperature model using a model state signal ($s2$), wherein the calculation state value ($c$) assumes a value indicative of a fault after the model state signal ($s2$) indicates an inaccuracy of the temperature model for a second time period ($t2$) longer than a second specified time period ($T2$).

9. The method of claim 1 wherein the temperature detection element is a temperature sensor.

\* \* \* \* \*